(12) United States Patent
Duncan

(10) Patent No.: US 8,933,380 B2
(45) Date of Patent: Jan. 13, 2015

(54) ENHANCED FLASH CHAMBER

(76) Inventor: Linden L. Duncan, Bloomington, IN (US)

(*) Notice: Subject to any disclaimer, the term of this patent is extended or adjusted under 35 U.S.C. 154(b) by 655 days.

(21) Appl. No.: 12/875,379

(22) Filed: Sep. 3, 2010

(65) Prior Publication Data

US 2011/0049134 A1 Mar. 3, 2011

Related U.S. Application Data

(60) Provisional application No. 61/275,869, filed on Sep. 3, 2009, provisional application No. 61/336,240, filed on Jan. 19, 2010.

(51) Int. Cl.
  *H05B 6/68* (2006.01)
  *B01J 19/08* (2006.01)
  *H05B 6/80* (2006.01)

(52) U.S. Cl.
  CPC ..................................... *H05B 6/806* (2013.01)
  USPC .......................................... 219/687; 422/186

(58) Field of Classification Search
  CPC ........ H05B 6/806; B01J 3/048; B01J 19/126; B01J 19/02; B01J 2219/00141; B01J 2219/00144; B01J 2219/00146; B01J 2219/0218
  USPC ......... 219/687, 688, 689, 682, 683, 628, 772, 219/679, 710, 734, 735, 686, 746, 748, 219/756; 422/107, 307, 294, 295, 302, 21; 202/205, 177, 181, 196; 430/78; 201/2.5
  See application file for complete search history.

(56) References Cited

U.S. PATENT DOCUMENTS

| | | | |
|---|---|---|---|
| 3,816,689 A * | 6/1974 | Long | 219/687 |
| 4,118,282 A | 10/1978 | Wallace | |
| 4,417,116 A * | 11/1983 | Black | 219/688 |
| 4,826,575 A | 5/1989 | Karamian | |
| 5,215,715 A | 6/1993 | Haswell et al. | |
| 5,338,409 A | 8/1994 | Heierli | |
| 5,338,557 A | 8/1994 | Pare | |
| 5,377,426 A | 1/1995 | Pare | |
| 5,407,641 A * | 4/1995 | Katschnig et al. | 422/107 |
| 5,420,039 A | 5/1995 | Renoe et al. | |
| 5,659,874 A | 8/1997 | Rault et al. | |
| 5,711,857 A | 1/1998 | Armstrong | |
| 6,175,104 B1 | 1/2001 | Greene et al. | |

(Continued)

OTHER PUBLICATIONS

E. Jerby and V. Dikhtyar, Drilling into Hard Non-Conductive Materials by Localized Microwave Radiation, 8th Ampere Conference, Bayreuth, Germany, Sep. 4-7, 2001, pp. 1-9.

(Continued)

*Primary Examiner* — Quang Van
(74) *Attorney, Agent, or Firm* — Krieg DeVault LLP

(57) ABSTRACT

An enhanced flash chamber with a flash chamber; a microwave source in communication with the flash chamber for providing a quantity of energy to a plurality of antennas within the flash chamber; a fluid chamber positionable within the flash chamber capable of holding a liquid and the plurality of antennas; and transport tubing for transporting a target material for extraction through the fluid chamber where the quantity of energy from the microwave source interacts with the plurality of antennas to heat the liquid held in the fluid chamber to a superheated state and the superheated state of the liquid transfers a portion of the quantity of energy to the target material to extract an extraction product from the target material.

3 Claims, 4 Drawing Sheets

(56) References Cited

U.S. PATENT DOCUMENTS

| | | | |
|---|---|---|---|
| 6,614,011 | B2 | 9/2003 | Omori et al. |
| 7,001,629 | B1 | 2/2006 | Mengal et al. |
| 7,119,312 | B2 | 10/2006 | Sedlmayr |
| 7,432,482 | B2 | 10/2008 | Sedlmayr |
| 2004/0187340 | A1 | 9/2004 | Chemat et al. |
| 2006/0006171 | A1 | 1/2006 | Sedlmayr |
| 2006/0153758 | A1 | 7/2006 | Cheung |
| 2007/0045297 | A1 | 3/2007 | Pare et al. |
| 2007/0122725 | A1 | 5/2007 | Kwon et al. |
| 2009/0038931 | A1 | 2/2009 | Cereceda Balic et al. |
| 2009/0074631 | A1* | 3/2009 | Longo .......................... 422/186 |

OTHER PUBLICATIONS

E. Jerby, O. Aktushev, and V. Dikhtyar, Theoretical Analysis of the Microwave-Drill Near-field Localized Heating Effect, Journal of Applied Physics 97, 034909 (2004).

Fan Zhang, Yi Yang, Ping Su and Zhenku Guo; Microwave-assisted Extraction of Rutin and Quercetin from the Stalks of Euonymus alatus (Thunb.) Sieb, Phytochem. Anal. 2009; 20:33-37.

Nurdin, R., Khalid, K., Talib, Z., and Sukari, A., Development of Essential Oil Extraction by Microwave Assisted Process from a Local Plant, Solid State Science & Tech. 14:1 (2006); 107-114.

Antenna Types, pp. 17-26.

Osman, N., Khalid, K., Hassan, J., Sukari, A., Microwave Assisted Process (MAP) for Extraction of Fragrances from Selected Malaysian Flower, Solid State Science & Tech. 14:1 (2006); 94-106.

E. Jerby, V. Dikhtyar, O. Aktushev, and U. Grosglick, The Microwave Drill, Science, vol. 298, Oct. 18, 2002; www.sciencemag.org.

Rassenfoss, Stephen, "Seeking More Oil, Fewer Emissions", JPT, Sep. 2012, pp. 34-38, vol. 64, No. 9, SPE International, US.

Terigar, B.G. et al.; An Analysis of the Microwave Dielectric Properties of Solvent-Oil Feedstock Mixtures at 300-3000 MHz; Bioresource Technology 101 (2010); 6510-6516; Elsevier (2010).

Terigar, B.G. et al.; Continuous Microwave-Assisted Isoflavone Extraction System: Design and Performance Evaluation; Bioresource Technology 101 (2010); 2466-2471; Elsevier (2009).

Terigar, B.C. et al.; Soybean and Rice Bran Oil Extraction in a Continuous Microwave System: From laboratory-to-pilot-scale; Journal of Food Engineering 104 (2011); 208-217; Elsevier (2010).

Kanitkar, Akanksha V.; Parameterization of Microwave Assisted Oil Extraction and its Transesterification to Biodiesel; Thesis—Louisiana State Univ.; 2010.

* cited by examiner

ENHANCED FLASH CHAMBER

CROSS-REFERENCE TO RELATED APPLICATIONS

The present application claims priority to U.S. Provisional Patent Application No. 61/275,869 filed Sep. 3, 2009 and U.S. Provisional Patent Application No. 61/336,240 filed Jan. 19, 2010, which are hereby incorporated by reference in their entireties.

TECHNICAL FIELD

The present invention generally relates to natural material extraction, and more particularly to microwave-enhanced natural material extraction.

BACKGROUND

The most widely used conventional method of oil extraction is by steam distillation, which works in the following way. Boilers are used to create steam by heating water. The steam and a target material are combined in a flash chamber. The target material releases its oils into the steam, which is then condensed and collected into a secondary vessel, where it is allowed to separate and the oil removed and utilized. This method usually requires the burning of fossil fuels or wood to begin the process (boilers making steam) and it uses large amounts of energy and time to achieve the desired outcome.

Current microwave-assisted methods of exposing materials directly to microwave energy achieve a similar outcome as steam distillation, but require less time and energy. Most microwave extraction techniques are small batch processes used only for analysis, and they have no direct commercial value. However the larger batch techniques use up to twenty or more magnetrons and require repeated exposures to microwaves to achieve the desired results. The common oil extraction techniques by microwave-assisted distillation are hydro-distillation and dry-distillation. Hydro-distillation is accomplished by heating the target material in a container of liquid. Dry-distillation is accomplished by percolating steam through a grid holding the target material. Solvents can be included in these prior art processes to accelerate the extraction process.

Present approaches to natural material extraction suffer from a variety of drawbacks, limitations, disadvantages and problems, including processing time, and energy consumption. There was a need for an improved microwave-enhanced natural material extraction that would overcome the drawbacks, limitations, disadvantages and problems of the prior art.

SUMMARY OF THE INVENTION

The enhanced flash chamber of the present invention includes a microwave source in communication with the flash chamber for providing a quantity of energy to a plurality of antenna within the flash chamber; a fluid chamber positionable within the flash chamber capable of holding a liquid and the plurality of antennas; and transport tubing for transporting a target material for extraction through the fluid chamber where the quantity of energy from the microwave source interacts with the array of antennas to heat the liquid media held in the fluid chamber to a superheated state and the liquid media in the superheated state interacts with the target material to extract an extraction product from the target material.

Further features of this embodiment include the target material not including a solvent, the flash chamber being maintained at atmospheric pressure, and the microwave source being magnetrons, klystrons, switching power supplies, solid state sources or various combinations of these. The apparatus may also include a separation vessel where the extraction product is subjected to at least one separation process. The system of transport tubing may further include a pump positioned approximate the material supply and/or a thermocouple positioned close to an outlet of the fluid chamber. The extraction product may further include a quantity of essential oils and the essential oils are substantially insoluble in water.

Another embodiment of the present invention is a method for using a microwave enhanced flash chamber including providing a flash chamber with a microwave source, a fluid chamber, at least one antenna, and a fluid pathway; creating a quantity of energy from the microwave source effective to interact with the at least one antenna to heat a liquid media held in the fluid chamber to a superheated state; providing a processed target material; moving the processed target material through the fluid pathway to interact with the liquid media in the superheated state in the fluid chamber positioned within the flash chamber; providing an extracted suspension of the processed target material; moving the extracted suspension of the processed target material from the flash chamber; and performing at least one secondary process on the extracted suspension of the processed target material.

Further features of this embodiment include at least one secondary process including separating an extraction product from the extracted suspension and/or extraction, cooling distillation, cold distillation, entraining, material addition, decanting, evaporation, collection and various combinations. The carrier fluid separated during the secondary process(es) may be recycled. The processed target material may be a mixture of a target material and a carrier fluid and providing the processed target material may include pumping the mixture from a target material source. The pump may be a peristaltic pump.

A yet further embodiment of the present invention is an apparatus with a means for generating a quantity of microwave radiation within a flash chamber; a means for subjecting a fluid chamber with at least one antenna to the quantity of microwave radiation; a means for inducing a flow of a target material through a fluid pathway; a means for controlling the inducing of the flow of the target material; a means for sensing parameters; and a means for recovering an extracted portion of the target material where the microwave radiation interacts with the antenna to produce a superheated state within the fluid chamber and where the flow of the target material interacts with the superheated state within the fluid chamber to produce the extracted portion of the target material.

DETAILED DESCRIPTION OF THE PREFERRED EMBODIMENTS

Figure 1:
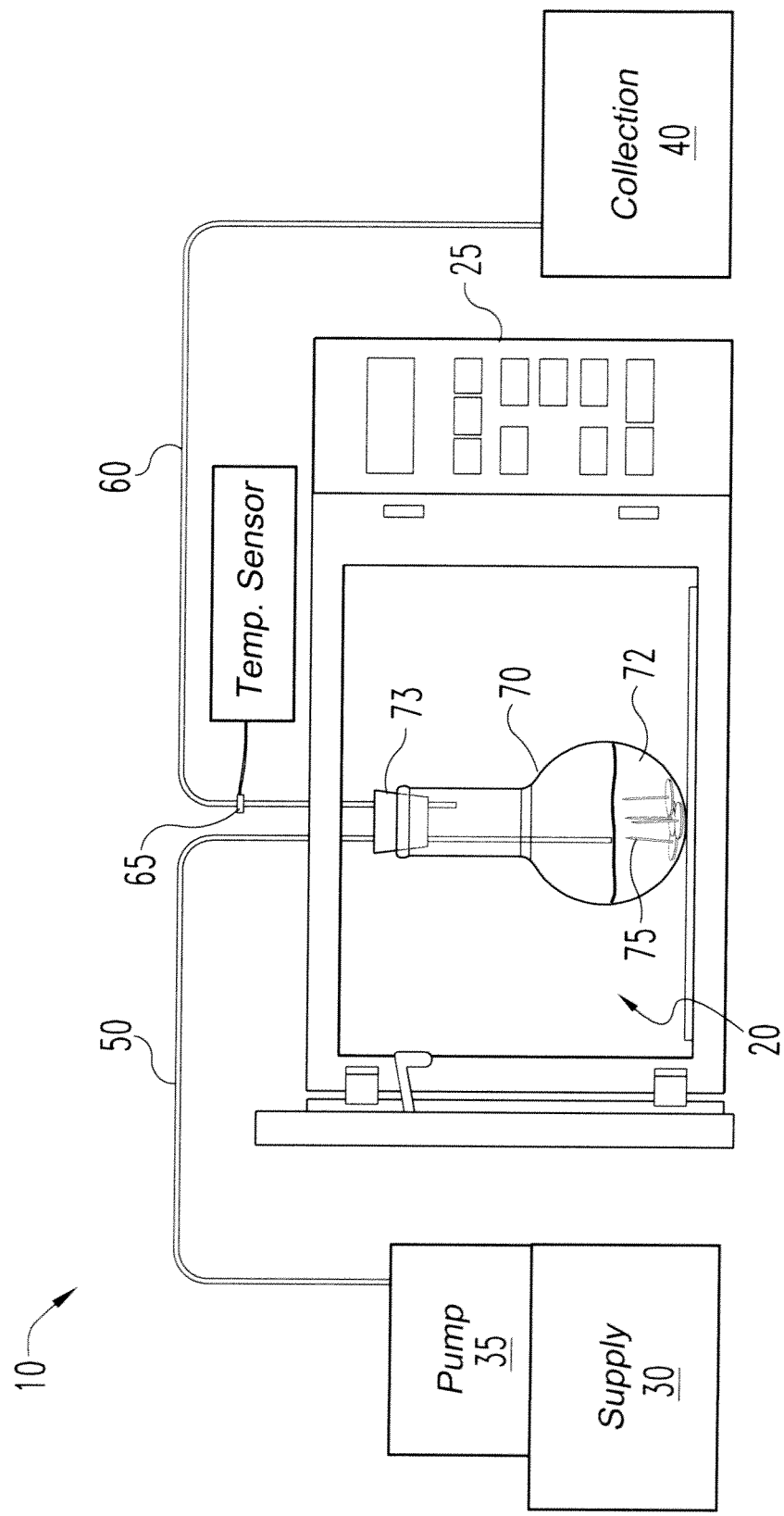
FIG. 1 is a schematic diagram of an enhanced flash chamber of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated that would normally occur to one skilled in the art to which the invention relates.

With reference to FIG. 1, one preferred embodiment of the present invention is a microwave enhanced flash chamber 10. Microwave enhanced flash chamber 10 has a flash chamber 20. A material supply source 30 is connected to a fluid chamber 70 within flash chamber 20 through supply tubing 50. A pump 35 may be used to aid in the transfer of material from supply source 30 through supply tubing 50 and into fluid chamber 70. Fluid chamber 70 in flash chamber 20 includes four antennas 75. A microwave source 25 directs microwave radiation at antennas 75 thereby creating a hot spot of superheated liquid contained within fluid chamber 70. A system of collection tubing 60 is also connected to fluid chamber 70 to allow post-flashed material to flow from flash chamber 20 to a collection vessel 40. A thermocouple 65 or other temperature reading device may be used to measure the temperature of the post-flashed material leaving flash chamber 20. A fiber optic thermometer may provide an measurement of temperatures inside flash chamber 20.

In one embodiment, the hot spot is created by directing microwave radiation on an array of antennas submerged in a liquid media contained in the flash chamber apparatus. The submerged antennas create this hot spot. The arrangement of high electro-negativity antennas allows for the movement of electrons which superheats the liquid media in the flash chamber. An extraction system of the present invention may allow for a more efficient extraction of larger volumes of target material.

Figure 2:
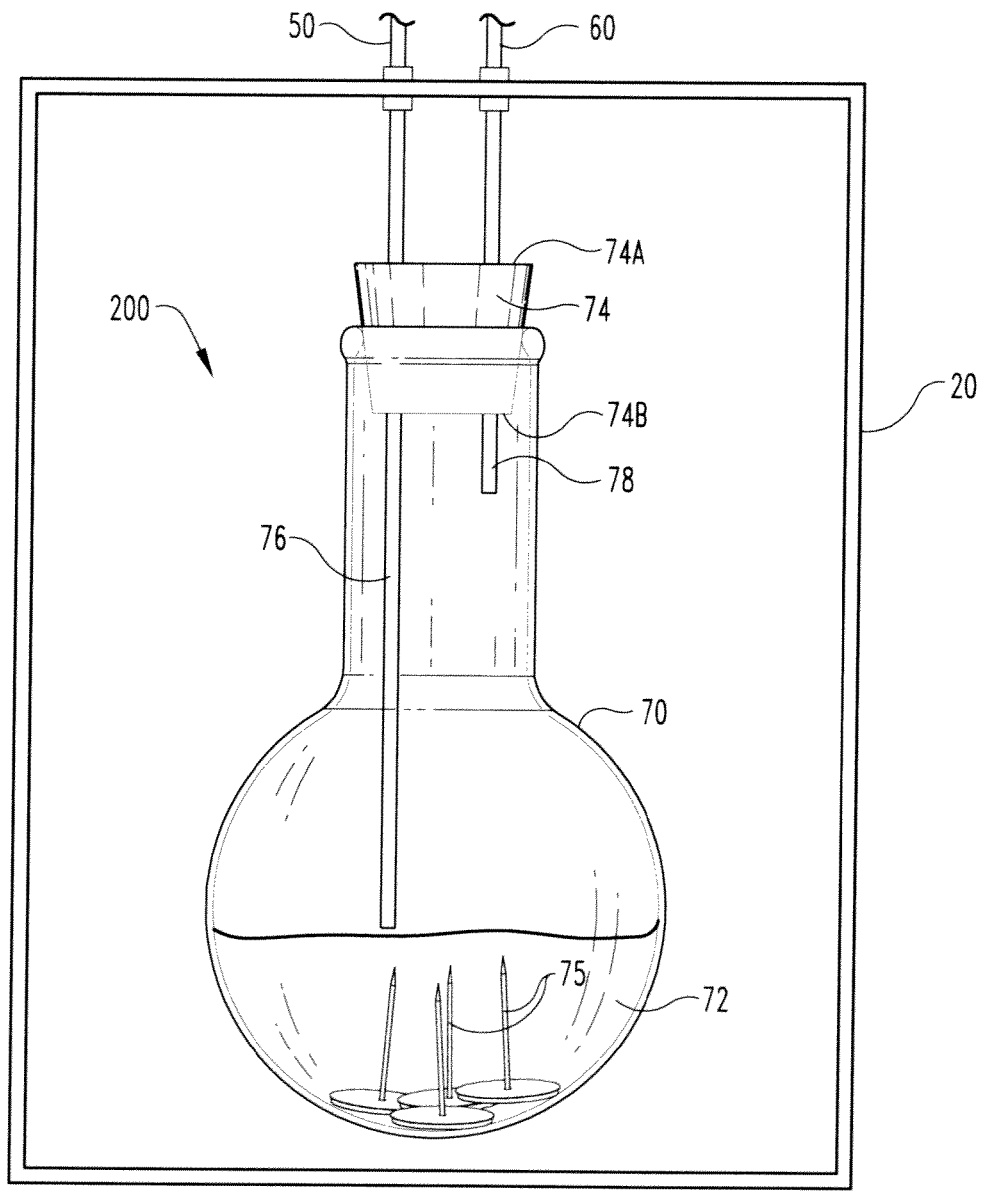
FIG. 2 is an enlarged view of the enhanced flash chamber of FIG. 1.

FIG. 2 is an enlarged view of fluid chamber 70. Fluid chamber 70 in the preferred embodiment is to date a glass round bottom flask, but fluid chamber 70 may be any container that is microwave transparent, heat resistant and will contain a suitable liquid media without reacting with the carrier liquid or the material during the microwave enhanced flash chamber process.

A stopper 74 is placed within the opening of fluid chamber 70. While stopper 74 is a neoprene stopper in the preferred embodiment to date, other suitable caps or lids may be used to seal the opening of the container used for fluid chamber 70. Stopper 74 has two holes constructed from a top flat surface 74A of stopper 74 through to a bottom flat surface 74B of stopper 74. Glass tubes 76,78 are inserted through the holes 74A,74B in stopper 74. Input glass tubing 76 is connected to supply tubing 50 and output glass tubing 78 is connected to collection tubing 60. Target material in a carrier fluid is able to flow from supply source 30 through supply tubing 50 and into fluid chamber 70 through input glass tubing 76. Post-flashed material is then forced out of fluid chamber 70 through output glass tubing 78 through collection tubing 60 and into collection vessel 40.

To accommodate placement of fluid chamber 70 in flash chamber 20 with the tubing 50,60,76,78; two holes are drilled through the top center of flash chamber 20. The holes are spaced identical to the holes of stopper 74. A microwave field monitor may be used to check the tube openings for glass tubing 76,78 at the top of flash chamber 20 for safety purposes. Ferrite filters may also be added to the tube openings. Fluid chamber 70 contains antennas 75 submerged in a liquid media 72. Four antennas are shown in the preferred embodiment to date though other quantities of antenna may be used.

The microwave energy of the present invention is focused by an array of antennas. The antennas may be quarter wavelength antennas for one embodiment and other lengths such as but not limited to half wavelength antennas for other embodiments. The antennas may include a material with high electro-negativity that is still economically available such as but not limited to tungsten, an aluminum/zinc/silver base with zinc plating or a carbon rod. The antennas are submerged in a liquid media in a fluid chamber creating a hot spot within the flash chamber of the apparatus when microwave radiation is directed toward the antenna in one embodiment. The arrangement and selection of the materials for the antennas may allow for the movement of electrons to superheat the liquid media within the flash chamber. The superheated liquid media is enabled to provide heat to the target material which then releases the natural oils within the target material.

Figure 3A:
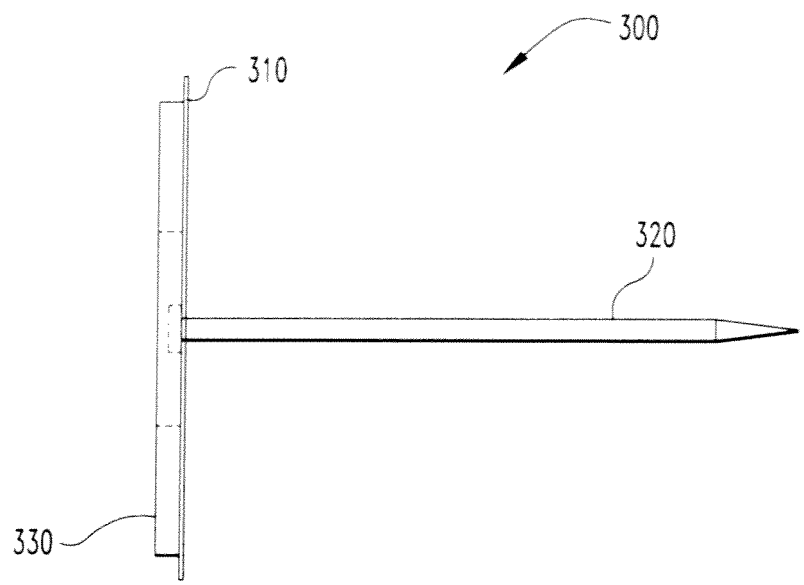
FIG. 3A is an enlarged side view of the antenna of the enhanced flash chamber of FIG. 1.
Figure 3B:
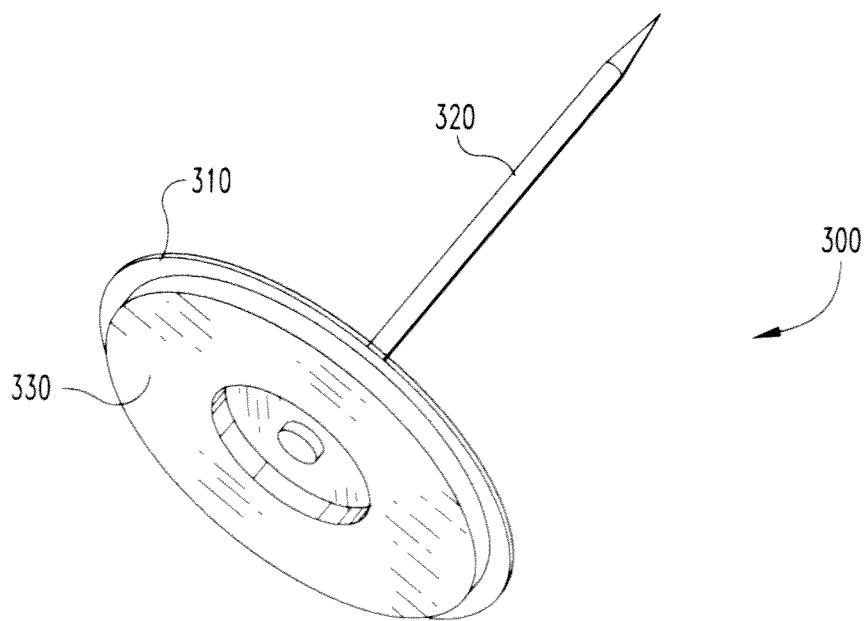
FIG. 3B is a perspective view of the antenna of FIG. 3A.

FIG. 3A is a side view of a preferred embodiment of an antenna 300 of the present invention and FIG. 3B is a perspective view of a preferred embodiment of antenna 300 of the present invention. For this preferred embodiment to date, a 30 mm diameter circle 310 was cut from aluminum plate material to create the base of antenna 300. A nail 320 or carbon rod was pushed through the center of circle 310. A ¾ inch washer 330 was added to the base of antenna 300. Antenna 300 was placed in the bottom of fluid chamber 70 as shown in FIG. 2.

Nail 320, aluminum circle 310, and washer 330 may be cemented to each other with silver solder. The antenna wavelength may be adjusted by known techniques to one skilled in the art, and the size of the fluid chamber may be adjusted to accommodate various applications. The power of the microwave source, such as but not limited to magnetrons, klystrons, switching power supplies, and solid state sources, may vary from the 1 kw used in the preferred embodiment to date. In one most preferred embodiment to date, four quarter wavelength antennas produced a maximum output temperature with a 1 kW magnetron. Optimization for other systems is easily accomplished by varying properties such as fluid chamber size, wavelength, microwave radiation source and strength, and flash chamber size.

One embodiment of the present invention is an enhanced flash chamber with a microwave source arranged to position a fluid chamber inside. A fluid pathway of flexible tubing leads from a target material supply to the fluid chamber. The fluid pathway starts at the target material supply and continues through a wall of the flash chamber into a stopper placed in the fluid chamber. The stopper includes two holes to accommodate the tubing of the fluid pathway. The first hole is for the flexible tubing of the fluid pathway from the target material supply to the fluid chamber. Flexible tubing may be attached to rigid rods such as but not limited to borosilicate glass where the glass tubing runs through the opening in the flash chamber through the hole in the stopper and into the fluid chamber. The second hole is for the flexible tubing of the fluid pathway running from the fluid chamber to the collection vessel outside of the flash chamber. Tubing from the inside of the fluid chamber through the stopper and through the opening in the flash chamber may include rigid tubing as discussed above.

The fluid pathway from the target material supply may include a pump such as but not limited to a peristaltic pump. The pump may induce and regulate the flow of target material from the target material supply through the fluid pathway to and from the fluid chamber.

For fluid chamber assembly 200 as shown in FIG. 2, the holes in stopper 74 can be made by rotating and pushing glass tubing 76,78 in and out of stopper 74. This action helps in moving glass tubing 76, 78 through the top of flash chamber 20 and into stopper 74. Fluid chamber 70 may be positioned in the center of flash chamber 20. Input glass tubing 76 may be pushed past the neck of fluid chamber 70 and output glass tubing 78 may be pushed to the bottom of stopper 74. The flask size used for fluid chamber 70 of other embodiments may be increased to accommodate a larger wavelength antenna such as a half wavelength antenna.

When attaching collection tubing 60 to output glass tubing 78, the tip of thermocouple 65 may be placed between collection tubing 60 and output glass tubing 78. Collection tubing 60 may empty into collection vessel 40. The temperature of liquid media 72 may be measured during the collection part of the process at thermocouple 65.

A field monitor may be used to check for microwave radiation leakage. There may be negative effects to boiling off the contents of fluid chamber 70. Microwave source 25 may be the first part of the process turned on and off.

The microwave enhanced flash chamber apparatus and process of another embodiment may also allow for greater amounts of material to be exposed and extracted through a continuous process. The size, power (i.e. antenna wavelength along with 1 kW, 3 kW magnetrons and the like) and number of flash chambers may be increased to accommodate larger volumes of target material.

Figure 4:
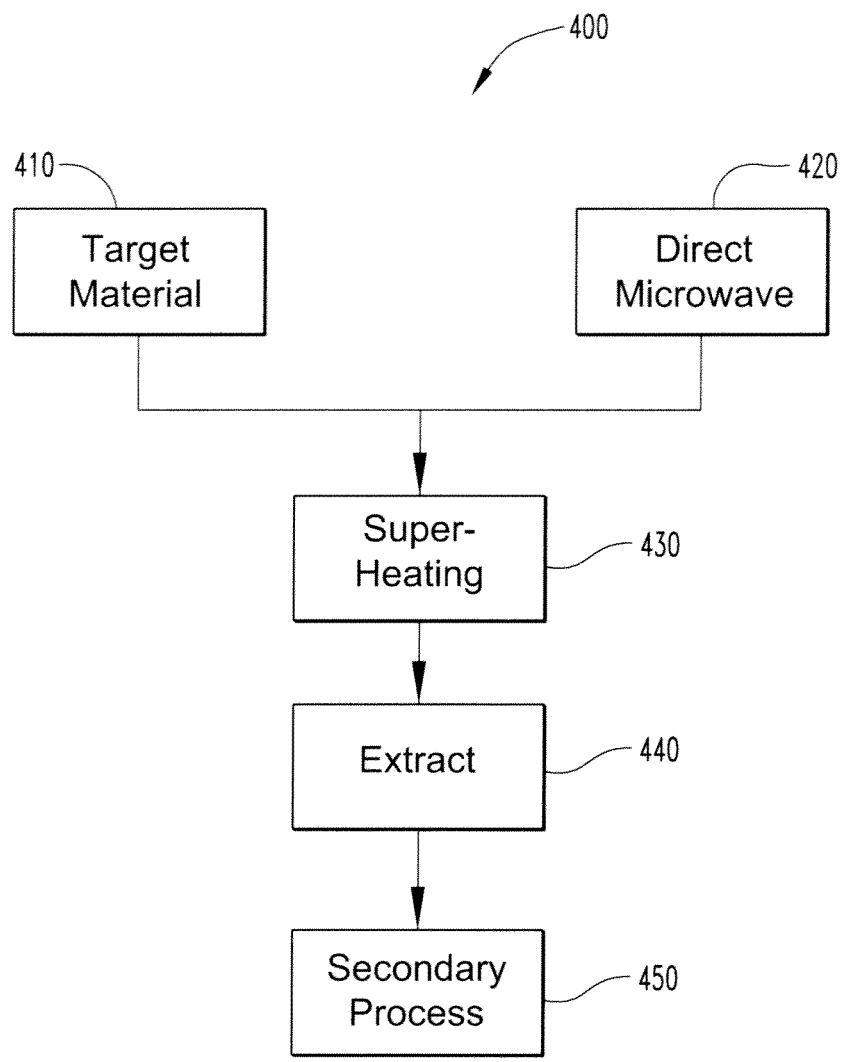
FIG. 4 is a flow diagram for an extraction process using the microwave enhanced flash chamber of FIG. 1.

FIG. 4 includes a flow diagram of the preferred embodiment to date of the present invention. An apparatus according to the present invention is assembled with a flash chamber, a microwave source, a fluid chamber, at least one antenna and a fluid pathway. A pump is activated in operation 410 to start the flow of target material through the fluid pathway to the fluid chamber. The flow fills the fluid chamber past the tops of the antennas.

The microwave source is also activated in operation 420 with the microwave radiation directed toward the antennas. The microwave-radiated antennas begin to superheat the fluid in the fluid chamber in operation 430. The superheated fluid begins to boil and steam forms. The pump may be adjusted so the steam reaction occupies half of the fluid chamber. The target material is pumped through the hot spot created by the superheated fluid and the extraction process takes place in operation 440. As the pump continues to transport the target material into the fluid chamber, the extraction suspension is transported out of the fluid chamber into a collection vessel. Secondary processing such as but not limited to extraction, cooling or cold distillation, entraining, material addition, decanting, evaporation, collection and various combinations may be performed in operation 450.

The microwave-enhanced device of the present invention may be capable of larger industrial applications where oil extraction or steam generation is required. The microwave enhanced flash chamber may provide a design for moving oil-bearing material through a hot spot and thereby heating the target material and separating the oil from the target material.

One embodiment of the present invention is a novel natural material extraction apparatus and process. In one preferred embodiment to date, a microwave enhanced flash chamber apparatus and process may be powered by a 1 kw magnetron to produce microwave radiation. In other embodiments, the microwave radiation may vary with the application. For this embodiment, the extraction process takes place in one chamber without a solvent at atmospheric pressure. Another embodiment may include solvent being added downstream of the microwave enhanced flash chamber process.

In another embodiment, the microwave enhanced flash chamber apparatus and process works in the following way.

Oil-bearing materials (i.e. plants, algae etc.) are processed with a carrier fluid, such as but not limited to water, and moved through a hot spot in a flash chamber. The hot spot making a continuous flow of material possible is created by antenna exposed to microwave radiation. The heat from the hot spot is transferred to the oil-bearing material in the carrier fluid. The heat extracts the oil from its associated components.

Simultaneously, the pressure of the material and carrier fluid flowing through the apparatus may force the mixture out of the microwave enhanced flash chamber to cool and separate in a secondary or post extraction processing vessel. The oil may be removed once allowed to separate from the residual target material, or if needed in a further embodiment, secondary processing such as but not limited to solvent addition and centrifuge may be applied during this part of the process. In the microwave enhanced flash chamber process of the present invention, the target material is not heated directly when producing a distillate/oil mixture.

EXAMPLE

Two studies were conducted using peanut material and soybean material following the same method as described in FIG. 4. 500 g of media were reduced to a 1.5 mm particle size solid substance using the deburring grinder and added to 6 L of 95% ethanol (solvent) in a 5 gallon carboy to provide a target material for the microwave enhanced flash chamber. The target material was processed through the microwave enhanced flash chamber apparatus as described in FIG. 1. The antennas used in this example had the aluminum plate removed to reduce the potential of electrical arcing igniting the ethanol solvent. The antennas were able to appropriately heat the flash chamber.

The target material solids were reduced to finer particles following processing in the enhanced flash chamber. The target material mixture was re-circulated through the microwave enhanced flash chamber at 91° Celsius for 30 minutes. The temperature of the post-flashed material was measured using a type K thermocouple as the material moved through the output glass tubing. The flow rate was measured using a graduated cylinder. The temperature was controlled by the flow rate at a pump supplying the target material to the microwave enhanced flash chamber. No external pressure was added to raise the temperature.

The input tube coming from the carboy to the pump was placed near the top of the liquid layer of ethanol and media. The output tube coming from the flash chamber was placed at the bottom of the carboy. Post-flashed material coming from the output tubing in the form of steam provided agitation to the solids at the bottom of the carboy.

The media being processed through the flash chamber became a fine white powder. After 30 minutes of circulation (3.5 liters every 4 minutes), the pump was stopped. The mixture was allowed to settle for 1 hour. There were two layers: a layer of solids at the bottom and a layer of liquid (majority ethanol) at the top. The ethanol was recovered by decanting and then filtering the layer of solids which had formed a micelle. The micelle of solids was mixed with water and allowed to settle for 3 hours. Three layers resulted from the water separation. The top layer of extracted oil was skimmed and placed into a separatory funnel. Additional oil extract was separated from the remaining layers with the separatory funnel. The target material circulated through the microwave enhanced flash chamber became a fine white powder as the oil was extracted and made available for separation. Extraction results are shown in Table 1.

TABLE 1

| Media | Oil extracted | % of oil by weight | % of oil extracted |
| --- | --- | --- | --- |
| Peanuts | 195.69 g | 39.3% | 19.6% |
| Soybeans | 64.89 g | 18% | 6.49% |

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An enhanced flash chamber comprising:
   a flash chamber;
   a microwave source in communication with the flash chamber for providing a quantity of energy to a plurality of high electro-negativity antennas within the flash chamber each antenna consisting of a conductive rod with high electro-negativity attached to a conductive base consisting of a plurality of conductive layers that receive the quantity of energy;
   a fluid chamber within the flash chamber capable of holding a liquid media and the plurality of antennas, the plurality of antennas being submerged within the liquid media in the fluid chamber; and
   transport tubing for transporting a targeted material for extraction within the fluid chamber.

2. An enhanced flash chamber including:
   a means for generating a quantity of microwave radiation within a flash chamber;
   a means for subjecting a fluid media chamber within the flash chamber and at least one antenna within the fluid media to the quantity of microwave radiation, the at least one antenna consisting of a conductive rod with high electro-negativity attached to a conductive base consisting of a plurality of conductive layers and being totally submerged within the liquid media in the fluid chamber;
   a means for inducing a flow of a targeted material within a fluid pathway; and
   a means for recovering an extracted portion of the targeted material,
   wherein the quantity of microwave radiation is received by the at least one antenna to produce a superheated state in the liquid within the fluid chamber and wherein the flow of the targeted material interacts with the superheated state in the liquid within the fluid chamber to produce the extracted portion of the targeted material.

3. The enhanced flash chamber of claim 1, wherein the quantity of energy provided to the plurality of antennas is effective to heat the liquid held in the flash chamber to a superheated state.

* * * * *